United States Patent [19]

Neu

[11] Patent Number: 4,838,202
[45] Date of Patent: Jun. 13, 1989

[54] ANIMAL LITTER CONTAINER

[75] Inventor: Larry R. Neu, Fresno, Calif.

[73] Assignee: Bernice Woock, Atwater, Calif. ; a part interest

[21] Appl. No.: 125,932

[22] Filed: Nov. 27, 1987

[51] Int. Cl.⁴ .............................................. A01K 29/00
[52] U.S. Cl. ....................................................... 119/1
[58] Field of Search ............................................ 119/1

[56] References Cited

U.S. PATENT DOCUMENTS

| 2,306,104 | 12/1942 | Carson | 119/1 |
| 3,085,550 | 4/1963 | Crawford | 119/1 |
| 3,246,630 | 4/1966 | Dearing et al. | 119/1 |
| 3,310,031 | 3/1967 | Lowe, Jr. | 119/1 |
| 3,377,990 | 4/1968 | Mitchell | 119/1 |
| 3,745,975 | 7/1973 | Prucha | 119/1 |
| 3,771,493 | 11/1973 | Chandor | 119/1 |
| 4,348,982 | 9/1982 | Selby | 119/1 |
| 4,627,381 | 12/1986 | Reed et al. | 119/1 |
| 4,732,111 | 3/1988 | Runion | 119/1 |

Primary Examiner—Robert P. Swiatek
Assistant Examiner—Michael Lynch
Attorney, Agent, or Firm—Worrel & Worrel

[57] ABSTRACT

An animal litter container having a first chamber adapted to receive animal litter and a second chamber adapted to prevent scattering of animal litter during use. The container consists of an inner housing surrounded by an outer housing with higher walls. Access to the container is by way of a cutout in the front wall of the container.

3 Claims, 1 Drawing Sheet

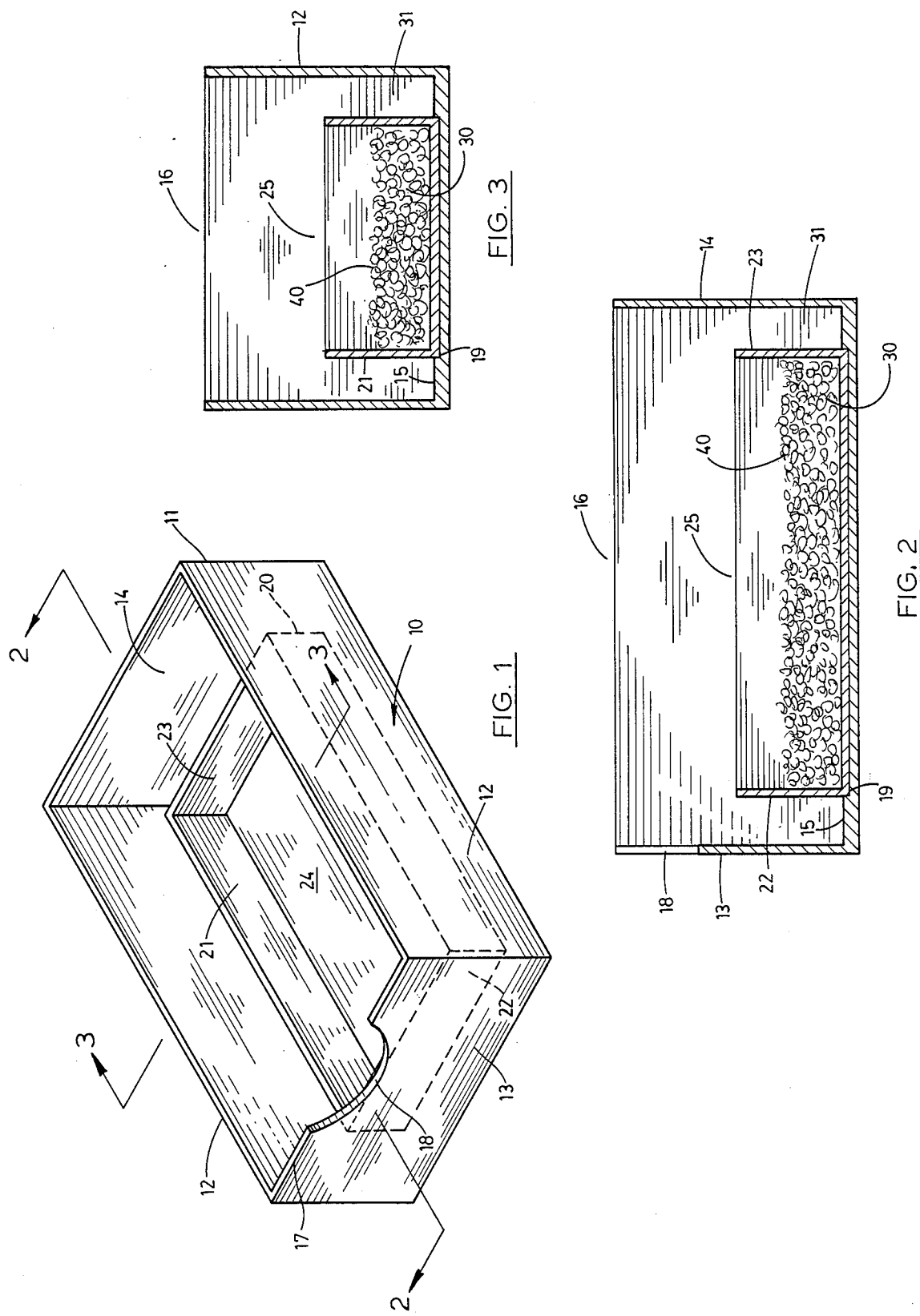

ANIMAL LITTER CONTAINER

BACKGROUND OF THE INVENTION

1. Field of the Invention

The present invention relates to a container for animal litter and more particularly to such a container which is uniquely well suited to housing animal litter for use by home pets in a manner as to allow easy access for the pet in using the container while preventing the litter from being scattered by the pet during use.

2. Description of the Prior Art

The use of animal litter containers has long been known. Animal litter containers make it possible to keep animals indoors by providing a means by which an animal may exercise their bodily functions indoors by means of a litter container. Use of an animal litter container makes it more convenient to keep animals as pets.

However convenient they may be, animal litter containers can be unsightly and unsanitary because of the scattering of the litter by the animal using the container. More particularly, certain animals, such as cats, instinctively bury their waste in the litter. In the process of doing this, litter is frequently scattered outside the container, some of it contaminated with animal waste. This creates both an unsightly and unsanitary condition.

Attempts made in the prior art to prevent the scattering of animal litter have assumed various forms. Many such prior art litter containers, for example, have a top and a bottom which limit access by the animal to the litter. A narrow opening in the top offers the only means of ingress and egress in many such devices.

While some of the prior art practices and devices have operated with varying degrees of success, they are unsatisfactory in one or more respects. For example, access to some of these devices is so limited that the animals for which they are designed will not use them. Others require that the animal be specially trained in order to use the litter container. Furthermore, some of these litter containers do not dependably prevent the scattering of the animal litter.

Therefore, it has long been known that it would be desirable to have a container capable of preventing the scattering of animal litter and which is easily accessible by the animal and requires no special training.

SUMMARY OF THE INVENTION

Therefore, it is an object of the present invention to provide an improved animal litter container.

Another object is to provide such a container which is easily accessible through both the top and one or more sides.

Another object is to provide such a container that requires no special training of an animal for use of the container.

Another object is to provide such a container that prevents the scattering of unsightly and unsanitary animal litter.

Another object is to provide such a container which achieves its objectives with little or no additional cost over prior art containers for animal litter, which is easy to operate without prior instructions, and which does not present a risk of injury to the animal.

Another object is to provide such a container which operates cooperatively with the instinctive propensities of animals in performing their bodily functions.

Another object is to provide such a container which can be constructed in a multitude of different forms and sizes while possessing the same operative advantages.

Further objects and advantages are to provide improved elements and arrangements thereof in an apparatus for the purposes described which is dependable, economical, durable and fully effective in accomplishing its intended purposes.

These and other objects and advantages are achieved in the animal litter container of the present invention wherein a first housing, having a floor with upstanding walls, has a second housing disposed on the floor of the first housing inwardly from the walls thereof and itself has walls defining a chamber adapted to receive animal litter whereby, in use, litter scattered from the chamber of the second housing is substantially confined by the walls of the first housing.

BRIEF DESCRIPTION OF THE DRAWING

FIG. 1 is a perspective view of the animal litter container.

FIG. 2 is a longitudinal, vertical section of the container taken on line 2—2 in FIG. 1 and showing animal litter disposed therein for illustrative convenience.

FIG. 3 is a transverse, vertical section of the container taken on line 3—3 in FIG. 1 and also showing animal litter disposed therein.

DESCRIPTION OF THE PREFERRED EMBODIMENT

Referring more particularly to the drawing, the animal litter container embodying the principles of the present invention is designated generally by the numeral 10 in FIG. 1. The container has a first or outer housing 11 and a second or inner housing 20 preferably, although not necessarily, constructed of high impact plastic.

The outer housing 11 has a pair of substantially parallel side walls 12 joined by front and back walls 13 and 14 respectively to form a boxlike container. As will subsequently be described, the walls of the outer housing are higher than the walls of the inner housing. The outer housing has a bottom 15 joining the side walls, front wall and back wall. The side walls, front wall and back wall, remote from the bottom 15, define an upper opening 16. The front wall has a top edge 17 in which is formed an animal entry passage or cutout 18. As best shown in FIGS. 2 and 3, the floor of the outer housing has a substantially rectangular recess 19 of relatively shallow depth for removably receiving the inner housing.

The inner housing 20 has a pair of substantially parallel side walls 21 joined by a front wall 22 and a back wall 23 to form the boxlike inner housing. The inner housing has a bottom 24 joining the side walls, front wall and back wall. The side walls, front wall and back wall remote from the location bound an opening 25.

As best understood by reference to FIGS. 2 and 3, the walls of the inner housing are shorter than the corresponding walls of the outer housing. The walls of the second housing are preferably substantially not greater than one half the height of the walls of the first housing. The walls of the inner should define a first chamber 30. The walls of the outer housing define a second chamber 31. As should be understood the second chamber is dimensioned such that an animal using the container is substantially prevented from fitting within the second chamber thereby causing the animal to move into the first chamber, the first chamber being adequately sized for the collection of litter scattered by the animal using the first chamber. As shown in FIGS. 2 and 3, the space between the walls of the second housing and the corresponding walls of the first housing is of a width, in the preferred embodiment, substantially not greater than one half the height of the walls of the second housing.

OPERATION

The operation of the described embodiment of the present invention is believed to be readily apparent and is briefly summarized at this point.

The operation of the animal litter container is best understood by reference to FIGS. 1 and 2. Suitable animal litter 40 is deposted in the first chamber 30 as, for example, shown in FIGS. 2 and 3. The container then is simply placed in an appropriate location for use by the pet.

The pet using the container enters by means of the cutout 18 in the front wall 13 and steps onto the litter 40 within the inner housing 20 over the front wall 22 thereof. Once the pet is in the first chamber 30, it performs its bodily functions in the normal manner. Any litter scattered from the inner housing during use is deflected inwardly by the walls 12, 13 and 14 of the outer housing 11 and falls into the second chamber 31 about the inner housing. The inner housing, being removable from the recess 19 in the floor 15 of the outer housing 11 is thus accessible for convenience in cleaning the inner and outer housings independently of each other and for replenishing the animal litter in the first chamber 30 of the inner housing.

Therefore, the container of the present invention is operable to confine animal litter to the container itself during use while being fully accessible to the animals without their exhibiting reluctance or requiring any training and while otherwise insuring that the most sanitary conditions can be maintained.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. An animal litter container comprising:
    a first housing having a floor with upstanding walls and a substantially rectangular recessed area of predetermined dimensions having borders substantially equally spaced from the corresponding walls of the first housing; and
    a second housing having a floor removably positioned in said recessed area of the floor of the first housing and having upstanding walls defining a chamber adapted to receive animal litter, whereby in use litter scattered from the chamber of the second housing is substantially confined by said walls of the first housing.

2. An animal litter container comprising a first housing having a floor with upstanding walls of a predetermined first height, said floor of the first housing having a recessed area; and a second housing for holding litter, having a floor with upstanding walls of a predetermined second height substantially not greater than one half said predetermined first height of the walls of the first housing, the floor of said second housing being removably positioned in said recessed area of the floor of the first housing and wherein said recessed area of the floor of the first housing is substantially equally spaced from the walls of the first housing so that when the floor of the second housing is received in said recessed area, the walls of the second housing are substantially equally spaced from the corresponding walls of the first housing a distance so as substantially to prevent an animal for which the litter container is intended from fitting therebetween whereby said animal wishing to use said litter passes over the walls of the first and second housing and the space therebetween to the litter and litter scattered from the second housing by the animal during use is substantially contained by the walls of the first housing.

3. The animal litter container of claim 2, wherein said space between corresponding walls of said first and second housings is of a width substantially not greater than one half said predetermined second height of the walls of the second housing.

* * * * *